US006170590B1

(12) United States Patent
Hisadomi

(10) Patent No.: US 6,170,590 B1
(45) Date of Patent: Jan. 9, 2001

(54) SNOWMOBILE WITH THROTTLE LEVER DEVICE

(75) Inventor: Masaru Hisadomi, Saitama (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/559,645

(22) Filed: Apr. 28, 2000

Related U.S. Application Data

(62) Division of application No. 09/015,903, filed on Jan. 30, 1998.

(30) Foreign Application Priority Data

Jan. 31, 1997 (JP) ............................................ 9-018418

(51) Int. Cl.[7] ............................................ B60K 28/00

(52) U.S. Cl. .......................... 180/190; 180/335; 74/502.2

(58) Field of Search .................................... 180/335, 182, 180/186, 190; 74/500.5, 501.6, 502.2

(56) References Cited

U.S. PATENT DOCUMENTS

| | | | | |
|---|---|---|---|---|
| 3,583,506 | * | 6/1971 | Preble | 180/335 |
| 3,758,736 | * | 9/1973 | Tanaka | 200/557 |
| 3,774,303 | | 11/1973 | Burkett et al. . | |
| 4,213,513 | * | 7/1980 | Beck | 180/272 |
| 4,237,997 | * | 12/1980 | Swanson | 180/272 |
| 4,619,341 | * | 10/1986 | Davis | 180/335 |
| 4,671,374 | | 6/1987 | Kouyama et al. . | |
| 4,807,580 | | 2/1989 | Clark . | |
| 4,827,861 | | 5/1989 | Goode . | |
| 4,899,610 | * | 2/1990 | Bourret | 74/489 |
| 5,364,145 | | 11/1994 | Epstein . | |
| 5,492,096 | | 2/1996 | Isaacs et al. . | |
| 5,551,395 | | 9/1996 | Isaacs et al. . | |

FOREIGN PATENT DOCUMENTS

| | | |
|---|---|---|
| 58-47143 | 3/1983 | (JP) . |
| 37493 | 3/1988 | (JP) . |
| 1193 | 1/1991 | (JP) . |
| 83711 | 12/1956 | (NL) . |

* cited by examiner

*Primary Examiner*—Kevin Hurley
(74) *Attorney, Agent, or Firm*—Birch, Stewart, Kolasch & Birch, LLP

(57) ABSTRACT

A throttle lever device for a small-sized vehicle includes an operating lever which is rotated manually about a pivot shaft to pull or return a cable connected to a throttle valve in a fuel supply unit such as a carburetor. The throttle lever device includes a first link adapted to rotate about the pivot shaft of the operating lever in accordance with the pivotal motion of the operating lever, and a second link supported rotatably through a shaft on a front end side of the first link. One end portion of the second link is engaged with the cable. The first link has a restricting portion for restricting the rotation of the second link. A stopper member disposed in the rotating direction of the second link is adapted to abut the second link. The amount of cable pulled changes relative to the amount of operation of the operating lever which controls the throttle valve.

17 Claims, 6 Drawing Sheets

SNOWMOBILE WITH THROTTLE LEVER DEVICE

This application is a divisional of co-pending application Ser. No. 09/015,903, filed on Jan. 30, 1998, the entire contents of which are hereby incorporated by reference.

BACKGROUND OF THE INVENTION

1. Field of the Invention

The present invention relates to a throttle lever device for a small-sized vehicle. Particularly, the invention is directed to a throttle lever device wherein the length of throttle cable pulled is changed in accordance with the amount of operation of an operating lever, thereby making the opening of a throttle valve in a carburetor variable.

2. Description of the Background Art

A conventional throttle lever device is disclosed in Japanese Patent Publication No. 1193/91. According to the background art disclosed therein, the amount of rotation of an operating lever and the length of a cable pulled thereby remain proportional to one another. This results in a flat operation feeling from a low speed range up to a full open range by operation of the operating lever.

According to the above conventional structure, the amount of operation of the operating lever is restricted to some extent, so when a carburetor throttle valve of a large diameter is to be operated, it is difficult to obtain a balance between the stroke and the load. on the other hand, in Japanese Utility Model Laid Open No. 37493/88, a throttle lever device is disclosed wherein the length of cable to be pulled is changed in accordance with the amount of operation of an operating lever. According to the construction disclosed therein, parallel links are used to change the length of the cable to be pulled relative to the amount of operation of the operating lever.

In the above construction, the device is large because parallel links are used. Particularly, a large external form results in an increase in size of the entire device, making it difficult to attach the device to the grip portion. Further, the links swing a large amount with respect to each other, and hence it is not convenient to use the device. Still further, the number of parts used increases and it is not easy to assemble the throttle operating mechanism. Since the amount of swing motion of the operating portion is large, especially that of the link mechanism, the device is difficult to position within a cover. If an attempt is made to accommodate the device within the cover, an extremely large sized cover must be used, which is not desirable. If the link mechanism is used on a snowmobile and exposed in an uncovered state, it is necessary to implement separate measures against the entry of snow into the mechanism.

SUMMARY OF THE INVENTION

The present invention is directed to solving the above-mentioned problems of a throttle lever device having the ability to change the amount of cable pulled relative to the amount of operation of an operating lever.

It is an object of the invention to provide a throttle lever device which is simple in structure, and utilizes a minimal number of components.

It is a further object of the invention to provide a throttle lever device which is compact in external form, permitting the utilization of a cover used in a conventional proportion type throttle lever device, requiring only a change of parts for direct application to the conventional proportion type.

It is yet another object of the invention to provide a throttle lever device which is superior in general purpose and also superior in point of function.

In order to solve the foregoing problems, there is provided a throttle lever device for a small-sized vehicle wherein an operating lever is rotated manually about a pivot shaft to pull or return a cable connected to a fuel supply unit such as a carburetor. The throttle lever device includes a first link adapted to rotate about the pivot shaft of the operating lever in accordance with the pivotal motion of the operating lever, and a second link rotatably supported by a shaft on a front end side of the first link. One end portion of the second link is engaged with the cable. The first link has a restricting portion for restricting the rotation of the second link. A stopper member is disposed in the rotating direction of the second link and abuts the second link.

The first link rotates with rotation of the throttle operation lever. The second link supported by the first link through a shaft is rotated by the restricting portion of the first link to pull the cable in proportion to the rotation of the throttle lever. Upon abutment of the second link with the stopper member, the second link rotates about the pivot shaft of the first link. The amount of rotation of the second link changes and increases relative, to the amount of rotation of the throttle lever, whereby the length of cable pulled also changes and increases.

It is possible to configure the throttle lever device in such a manner that in low and medium speed ranges of the engine, the throttle lever rotates by operation of a light load by an amount proportional to the amount of operation of the operation. However, in a full open range of the engine after abutment of the second link with the stopper member, the operating load of the throttle lever is increased to shorten the cable pulling stroke. Further, a restrictive feeling is created by abutment of the second link with the stopper member, whereby the operator can feel an approach to the full open range of the engine.

The position of abutment of the stopper member with the second link is adjustable. Therefore, by adjusting the abutting position of the stopper member, it is made possible to adjust the rotatable range of the throttle lever and thereby attain characteristics matching the engine characteristics, driver's taste and convenience of use. All that is required is a mere adjustment of the abutting position of the stopper member with respect to the second link, and therefore the adjusting work is easy and the structure is simple.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
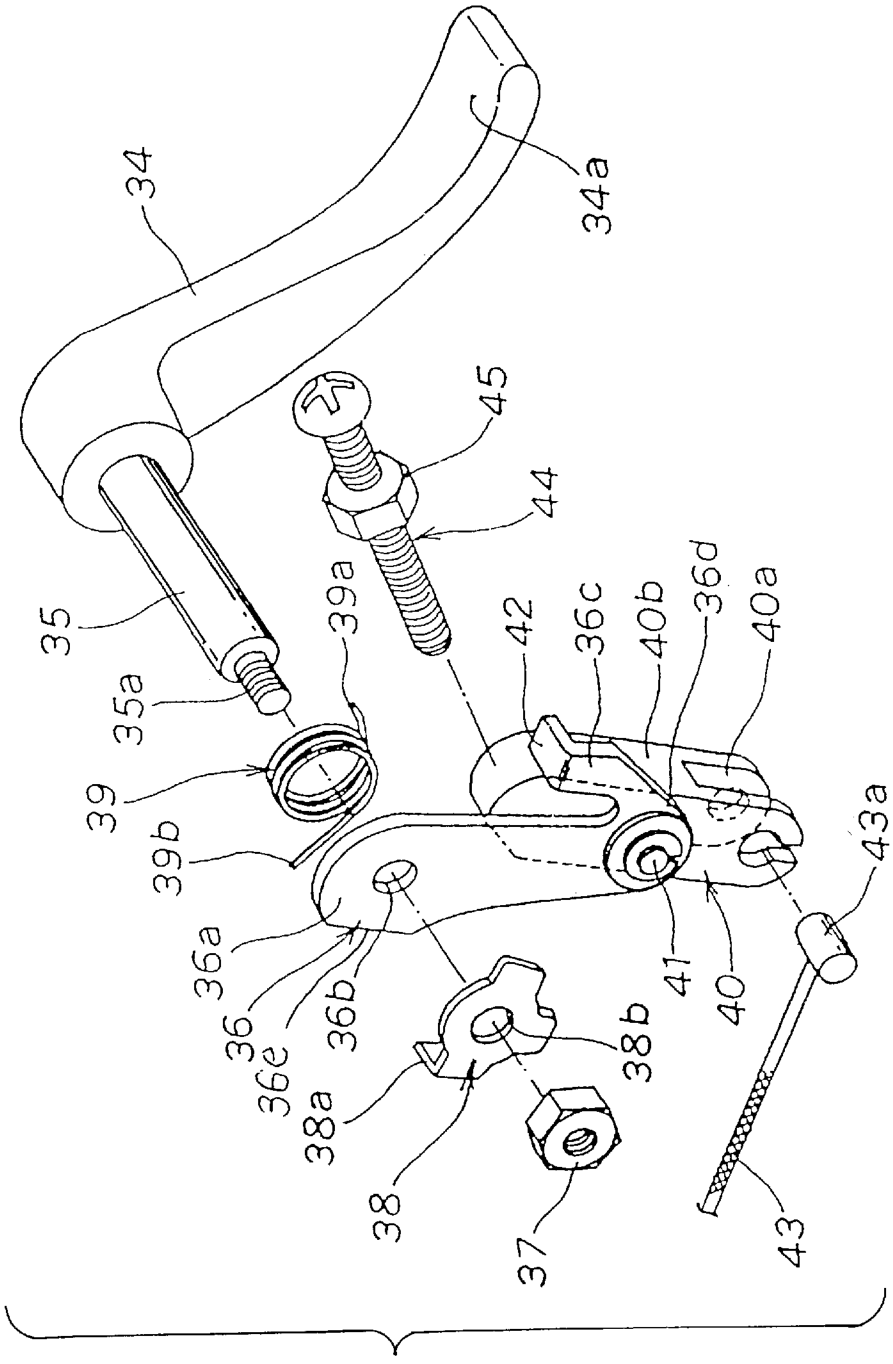
FIG. 1 is an exploded perspective view showing components of a throttle lever device according to the present invention.

An embodiment of the present invention will be described hereinafter with reference to the accompanying drawings. A snowmobile 1 is an example of a vehicle to which the present invention may be applied, and will be described below schematically with reference to FIGS. 5 and 6.

A frame 2 of the snowmobile 1 comprises right and left head members 2*a*, 2*a* located right and left of a front end portion of the frame. The frame 2 further includes right and left main frames 2*b*, 2*b* extending rearwardly from the head members 2*a*, 2*a* in a downwardly inclined manner. A floor 3 extends rearwardly from the lower portions (rear portions) of the main frames 2*b*, 2*b*. An engine is located below the main frames 2*b*,2*b* 4, and a fuel tank is located above the main frames 5. Further, a carburetor 6 which constitutes a fuel supply unit is located behind the engine 4.

Figure 5:
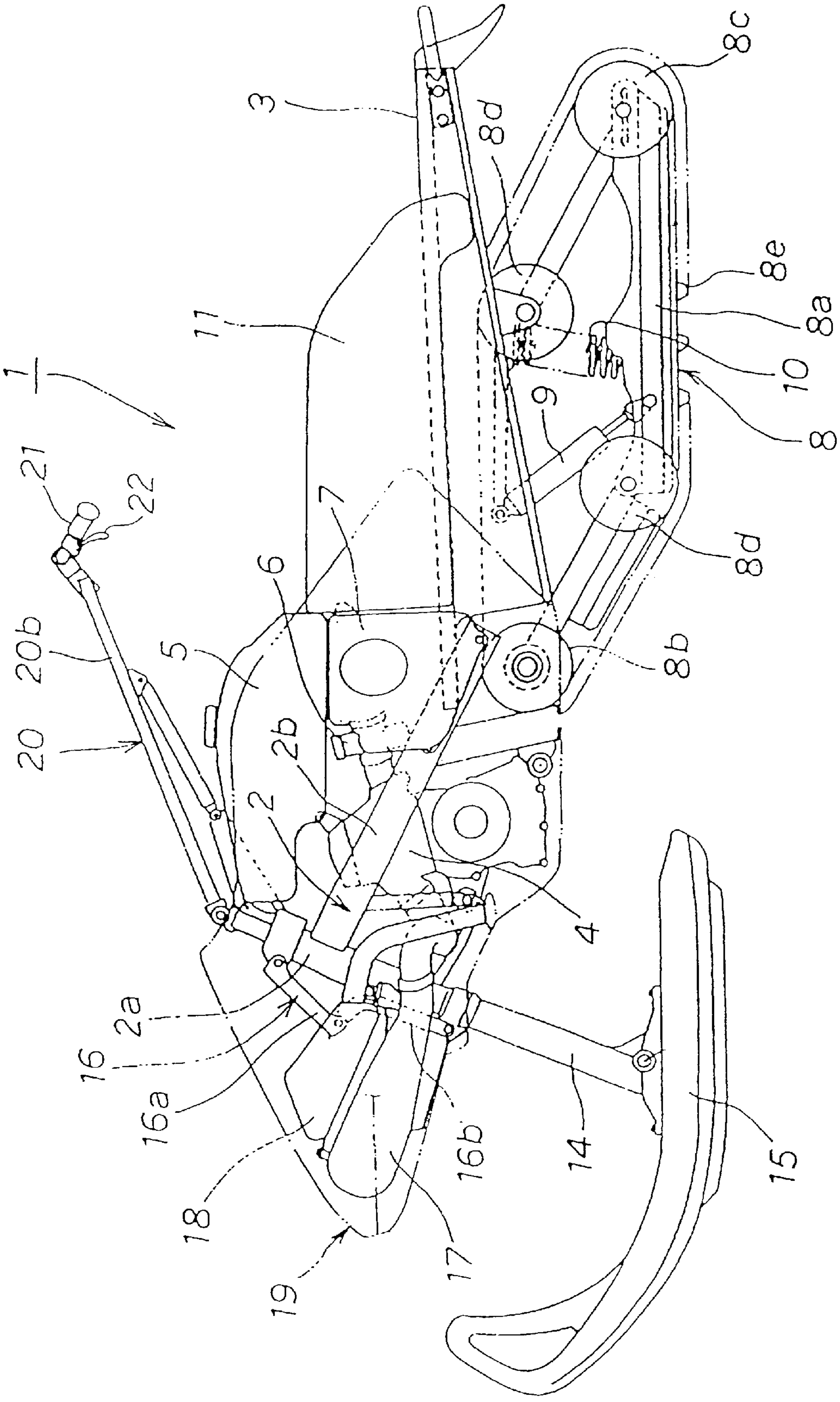
FIG. 5 is a side view schematically showing a snowmobile as an example of object to which the invention is applied.
Figure 6:
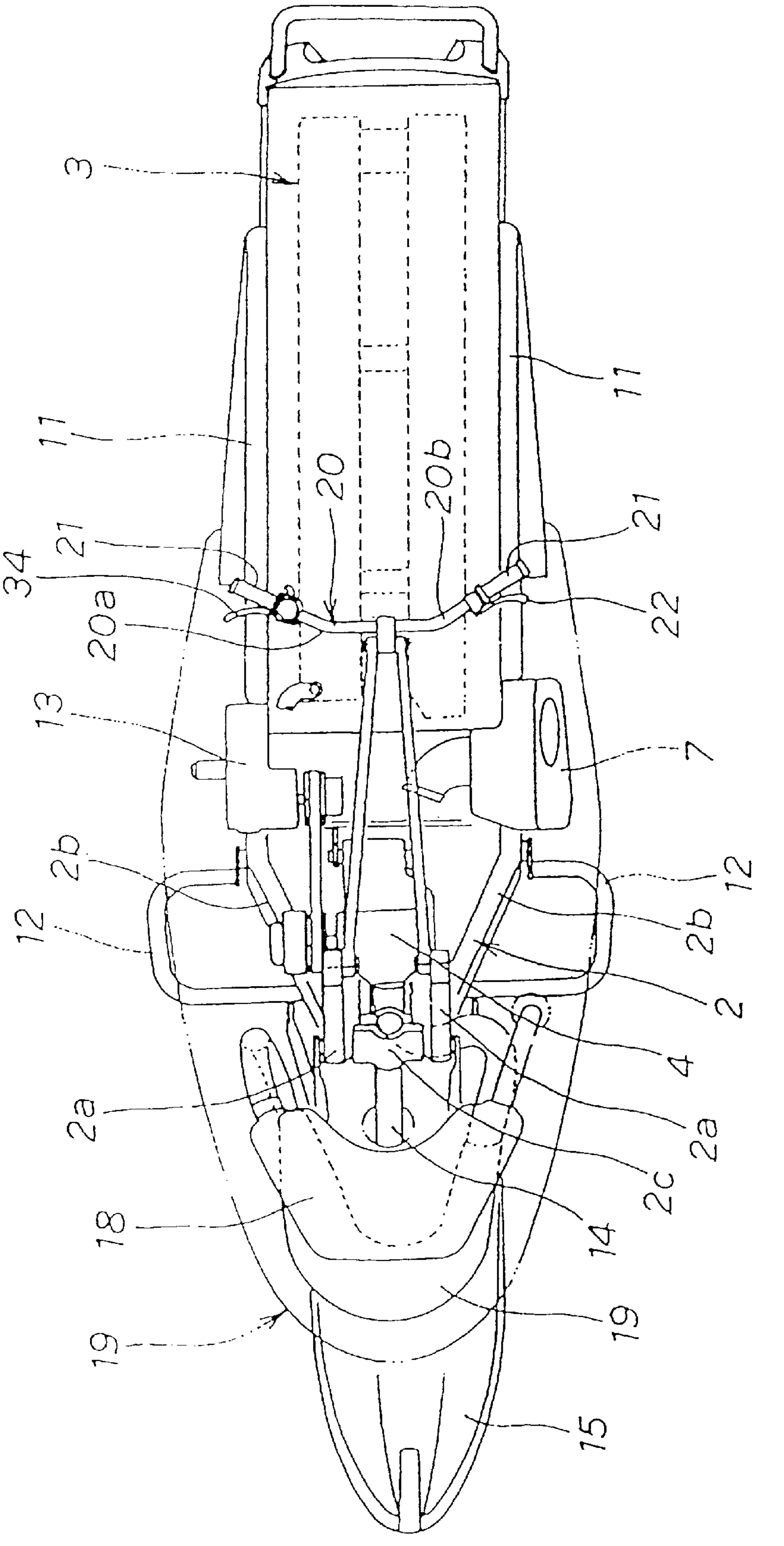
FIG. 6 is a plan view of the snowmobile shown in FIG. 5.

An air cleaner 7 is located on one side of the carburetor 6. A track belt mechanism 8 is located below the floor 3 for driving the snowmobile. The track belt mechanism 8 is provided with a driving wheel 8*b*, a driven wheel 8*c* and floating wheels 8*d*, 8*d*, which are supported by a swing arm frame 8*a*. An endless track belt 8*e* surrounds those wheels. A shock absorber 9 and a spring 10 for the suspension mechanism are located between the frame 8*a* and the floor 3. FIG. 5 shows a side guard plate 11, and FIG. 6 shows a side guard 12 and a gear box 13 for transmitting a driving force to the driving wheel 8*b*.

A base portion of a fixed support shaft (not shown) provided at the upper end of a steering shaft member 14 is fixed and held by means of a holder 2*c* located between the head members 2*a*, 2*a*. A single ski 15 is attached to and supported by the lower end of the steering shaft member 14 so that it can pivot up and down. A base portion of a handle 20 is mounted onto the upper end of the steering shaft member 14 and is supported thereby.

The handle 20 is provided with right and left handle bars 20*a*, 20*b*. The handle bars 20*a* and 20*b* are vertically swingable and transmit right and left steering motions of the handle 20 to the steering member 14 through a link mechanism 16 which permits vertical movements of the handle, to steer the steering member 14 right and left.

An exhaust gas expansion chamber 17 and a muffler 18 are located in front of the head members 2*a*, 2*a* in a superposed relation to each other to constitute an exhaust system. As shown in FIG. 6, the exhaust gas expansion chamber 17 and the muffler 18 are each generally in the shape of an arc centered on the steering shaft, and the steering link mechanism 16 is disposed in their arcuate spaces. The exhaust system and the front portion of the floor 3 are surrounded with a cowling 19.

Grips 21, 21 are attached to end portions of the handle bars 20*a* and 20*b* of the handle 20. A throttle lever device 30 according to the present invention is disposed on the inner side of the grip 21 of one handle bar 20*a*, while a brake lever 22 is provided on the inner side of the grip 21 of the other handle bar 20*b*.

Figure 2:
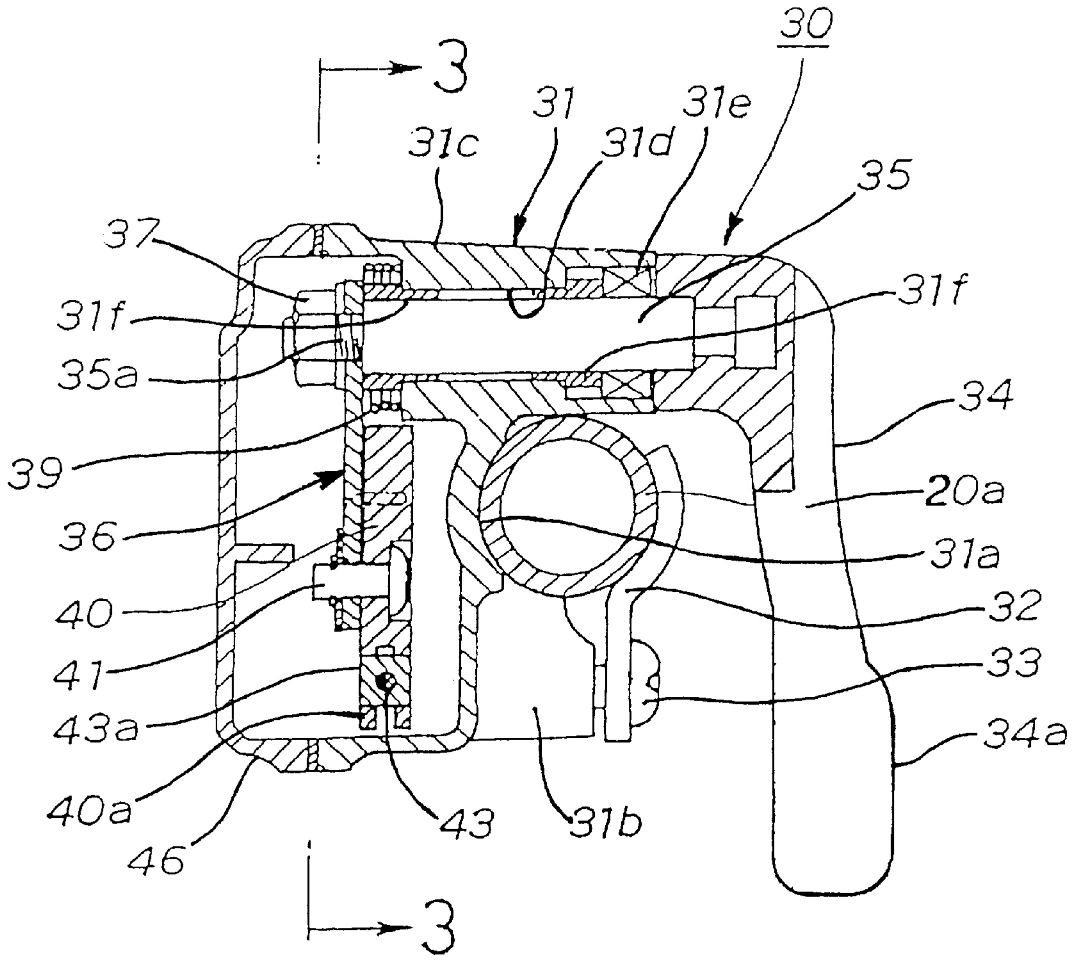
FIG. 2 is a front cross-sectional view of the throttle lever device attached to a handle bar taken along line 2—2 in FIG. 3, with a cover shown.
Figure 3:
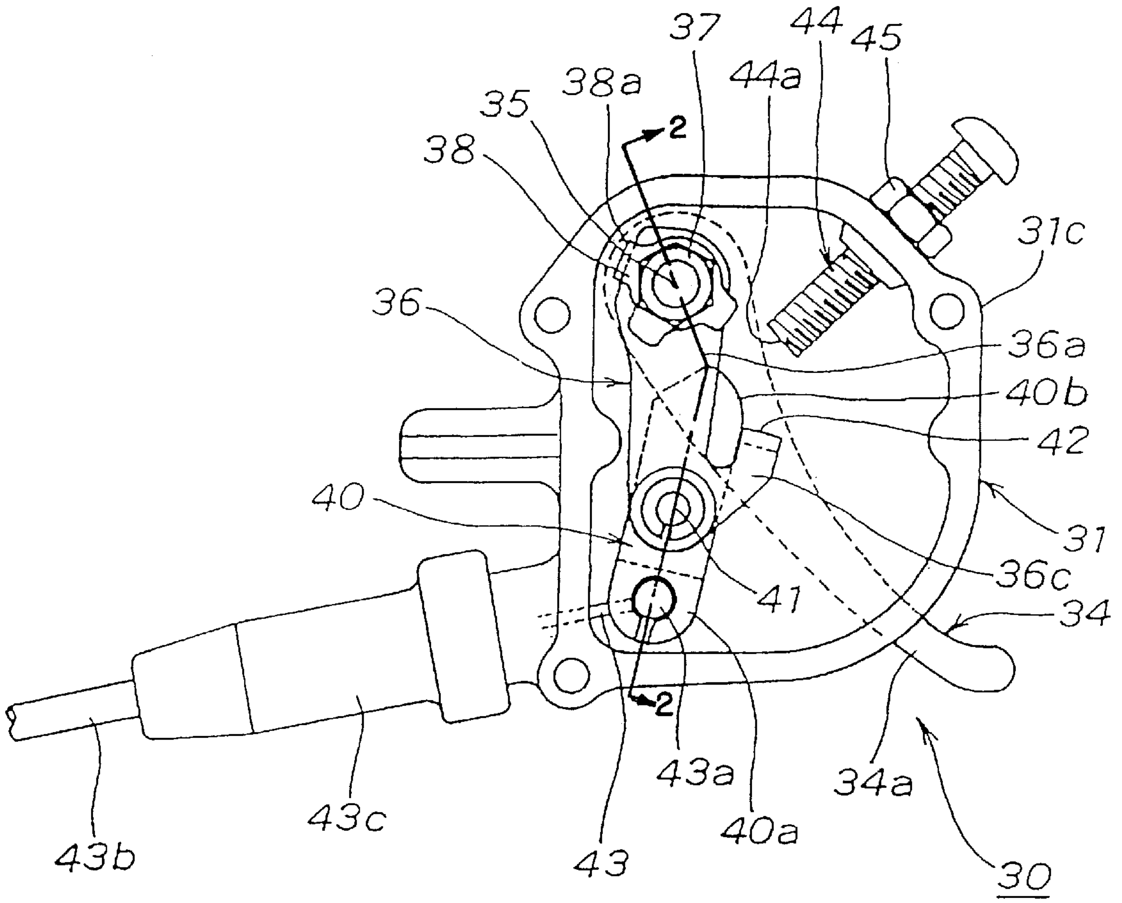
FIG. 3 is a side view of the throttle lever device taken along line 3—3 in FIG. 2, with a cover removed.
Figure 4A:
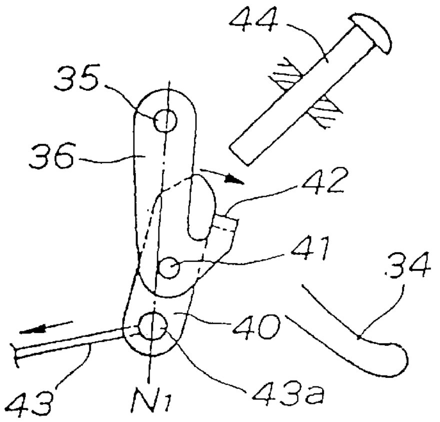
FIGS. 4(*a*) to (*f*) are diagrams for explaining the operation of the throttle lever device of the present invention.
Figure 4B:
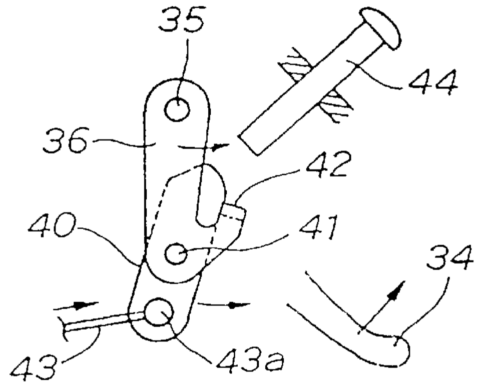
Figure 4C:
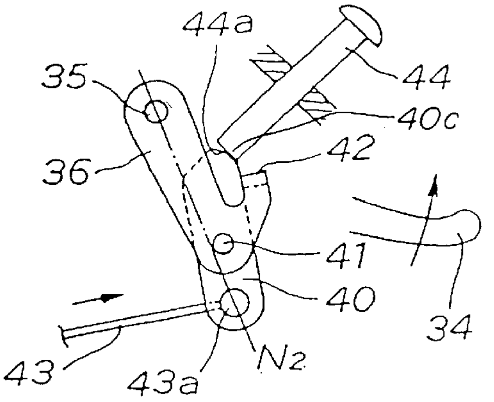
Figure 4D:
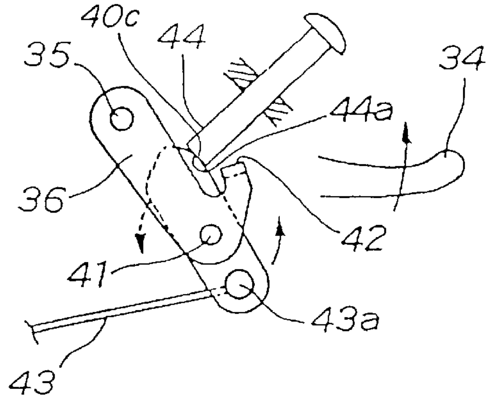
Figure 4E:
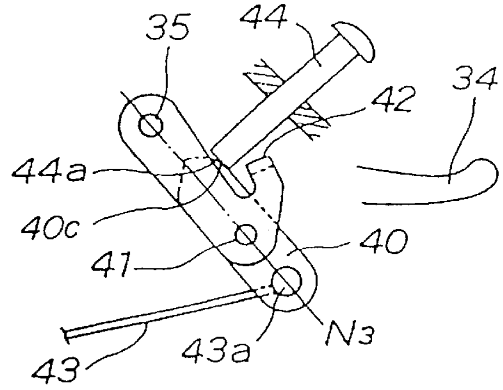
Figure 4F:
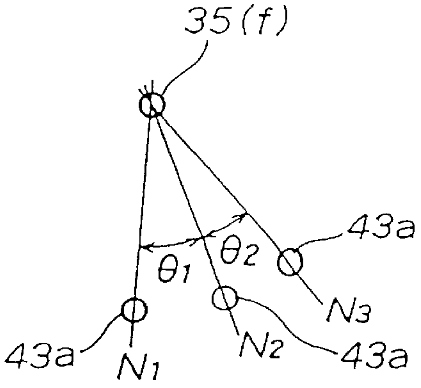

The details of the throttle lever device 30 are shown in FIGS. 1 to 3. As shown in FIGS. 2 and 3, a box-shaped cover body 31 is fixed to the handle bar 20*a* in the following manner. First, a recess 31*a* formed in the lower portion of a side face of the cover body 31 is fitted on the handle bar 20*a* at a position inside the grip 21. Then, from the opposite side, a metallic bearing piece 32 is bolted to a boss portion 31*b* formed below the recess 31*a* with a bolt 33.

An upper portion 31*c* of the body 31 has a bore 31*d* formed in a direction orthogonal to the axis of the handle bar 20*a*, and a support shaft 35 is inserted into the bore 31*d*. The support shaft 35 is integral with an operating lever 34 which constitutes a throttle operating lever, one end of the support shaft 35 being fixed to a base portion of the operating lever 34. The support shaft 35 is rotatably supported through a seal member 31*e* and bearings 31*f*,31*f*.

As shown in FIG. 1, the operating lever 34 and the support shaft 35 form a generally L-shaped member when viewed from the front. A front portion 34*a* of the operating lever is formed in a flat shape so that it can be pushed easily with a finger.

External threads 35*a* are formed on an end portion of the support shaft 35. A support hole 36*b* formed in a base portion 36*a* of a first link 36 is fitted on the external threads 35*a*. A nut 37 is threadably engaged with the external threads 35*a* to fix the first link 36 to the end portion of the support shaft 35.

The first link 36 is formed as a plate, and when it is fixed to the support shaft 35 with the nut 37, a locking piece 38 is interposed between the nut 37 and the base portion 36*a* of the first link 36. The locking piece 38 has a loose support hole 38*b* therein. The loose support hole 38*b* is brought into threaded engagement with the external threads 35*a*, and then the nut 37 is threadably engaged with the external threads 35*a* to support the locking piece 38 on a side face of the first link 36.

A locking portion 38*a* which is bent axially is formed at an end portion of the locking piece 38. The locking portion 38*a* comes into abutment with a rectilinear, rear edge 36*e* formed at the base portion 36*a* of the first link 36.

A return spring 39, constituted by a torsion spring for example, is fitted on the support shaft 35. One end portion 39*a* of the spring 39 is anchored to the cover body 31, and an opposite end portion 39*b* thereof is anchored to the locking portion 38*a* of the locking piece 38. After rotation with the lever 34, the first link 36 is returned as the locking piece turns back under the action of the spring 39.

A middle portion of a second link 40 is pivotally attached to the lower portion of the first link 36. In this embodiment, the second link 40 is in the shape of a thick oval, and its lower portion 40*a* is bifurcated.

The lower portion of the first link 36 is U-shaped, and an upwardly bent front end portion 36*c* is provided with a restricting portion 42 which is bent toward the second link 40. The restricting portion 42 is in abutment with an upper half portion of one edge 40*b* on a long side of the second link 40. A middle portion of the second link, 40 is supported through a shaft by a U-shaped bottom portion 36*d* of the first link 36.

A cable, or wire, 43 constitutes a throttle valve control cable. A retaining member 43*a* is provided at a first end of the cable 43, and is locked to the bifurcated lower portion 40*a* of the second link 40. The cable 43 is connected at its second end to an operating shaft of the throttle valve in the carburetor which constitutes a fuel supply unit. In FIG. 3, an outer surface 43*b* of the wire 43, and an end handling cap 43*c*, are shown.

A stopper member 44 is disposed in the rotating direction of the second link 40 which comes into abutment with the second link 40 at a predetermined rotational angle of the second link 40. The stopper member 44 is a shaft-like externally threaded member, such as a long screw. The stopper member 44 is disposed obliquely in the upper portion 31*c* of the cover body 31 on the side opposite to the rotating direction of the operating lever 34 in such a manner that its front end portion faces an upper inner space defined within the cover body 31.

As shown in FIG. 3, the stopper member 44 is disposed on the front side of the upper portion 31*c* of the cover body so that its lower half portion is inserted into the space through a tapped hole formed in this portion. A lock nut 45 is threadably engaged with the outside of the cover upper portion 31*c* to fix the stopper member 44 at a predetermined position. The stopper member 44 is moved forward and backward within the space by loosening the lock nut 45 and turning the stopper member 44.

A front end portion 44*a* of the stopper member 44 comes into abutment with an abutment portion 40*c* one edge 40*b* of the second link 40 at a predetermined rotational angle of the second link 40.

The first link 36, nut 37, locking piece 38, spring 39, second link 40, cable 43 and stopper member 44 are disposed in the body 31 on the side opposite to the operating lever 34, and are covered with a cover 46, as shown in FIGS. 2 and 3.

The operation of the throttle lever device will now be described with reference to FIGS. 4(*a*) through 4(*f*). FIG. 4(*a*) shows a state before operation of the operating lever 34. When the cable 43 is pulled in the arrowed direction, a rotating force in the clockwise direction in the figure, centered on the pivot shaft 41, acts on the second link 40. This rotating force is restricted by abutment of the second link 40 with the restricting portion 42 of the first link 36 located in the rotating direction, so that a further rotation of the second link is inhibited.

Next, as shown in FIG. 4(*b*), the operating lever 34 is turned counterclockwise as indicated with an arrow. Against the restoring force of the spring 39 acting on the locking piece 38, the first link 36 rotates counterclockwise about the pivot shaft 35 of the operating lever 34, as indicated with an arrow. Since the second link 40 is connected to the first link 36 through the pivot shaft 41, it swings in the above direction conjointly with the first link 36, as indicated with an arrow. As a result, the cable 43 is pulled as indicated with an arrow to open the throttle valve connected to the wire 43.

During the initial-stage operations of the operating lever 34, the first and second links 36, 40 rotate integrally about the pivot shaft 35, and the cable 43 is pulled in proportion to the amount of operation of the lever 34. For example, the amount of cable pulled initially is small.

As the operating lever 34 continues its turning operation, a shift is made from the state shown in FIG. 4(*b*) into the state shown in FIG. 4(*c*). In FIG. 4(*c*), the second link 40 abuts the end portion 44*a* of the stopper member 44 located in the rotating direction of the second link. This abutted state of the second link 40 with the end portion 44*a* of the stopper member 44 gives rise to an increase of resistance, providing the operator with a restricting feeling.

In FIGS. 4(*b*) to 4(*c*), the pulling strokes of the cable 43 are proportional to the amount of operation of the lever 34, and the operating load is light.

With a further operation of the lever 34, as shown in FIG. 4(*d*), since the second link 40 is in abutment with an end portion of the stopper member 44, a rotating force in the counterclockwise direction as indicated with an arrow acts on the second link around the pivot shaft 41, so that the lower end portion 40*a* of the second link 40 turns counterclockwise as indicated with an arrow. That is, the second link 40 pivots about the pivot shaft 41, with the result that the length of the cable 43 pulled increases as compared with the amount of operation of the operating lever 34.

Upon abutment of the second link 40 with the stopper member 44, a restrictive feeling is felt. Continued rotation of the operating lever 34 causes the second link 40 to pivot with respect to the first link 36, so that the operating load increases thereafter.

FIG. 4(*e*) shows a maximum operated position of the operating lever 34. FIG. 4(*f*) shows moving traces of the support point 43*a* at the lower end portion of the second link 40 centered on the pivot shaft 35. In the same figure there are shown the initial state of FIG. 4(*a*), the state of FIG. 4(*c*) in which the second link 40 has abutted the stopper member 44, and the state of FIG. 4(*e*) in which the operating lever is in its maximum operated position. At an angle of $\theta 1$, the operating load is light and the length of the cable 43 pulled is small in comparison with the amount of operation of the lever 34. In a rotational angle range of $\theta 2$ after abutment of the second link with the stopper member 44, the length of the cable 43 pulled is large in comparison with the amount of operation of the lever, and the operating force also becomes large as noted previously.

The position of $\theta 1$ and $\theta 2$ can be adjusted by adjusting the degree of projection and retraction of the stopper member 44. Thus, the pulling stroke of the cable 43 by operation of the operating lever 34 can be adjusted easily by adjusting the degree of projection and retraction of the stopper member 44, while taking into account the engine characteristics and the operator's taste. This adjusting work can be done by turning the stopper member 44 because the stopper member is a screw. Thus, the adjustment is extremely easy and the structure is simple.

The present invention is a throttle lever device for a small-sized vehicle, wherein an operating lever is rotated manually about a pivot shaft to pull or return a cable connected to a fuel supply unit such as a carburetor. The throttle lever device includes a first link adapted to rotate about the pivot shaft of the operating lever in accordance with the pivotal motion of the operating lever. A second link is rotatably supported by a shaft on a front side of the first link. One end portion of the second link is engaged with the cable. The first link has a restricting portion for restricting the rotation of the second link. A stopper member is adapted to abut the second link. The stopper member is disposed in the rotating direction of the second link. Therefore, with rotation of the throttle lever, the first link rotates and the second link pivotally connected to the first link is rotated by the restricting portion of the first link, so that the cable is pulled in proportion to the operation amount of the throttle lever. Upon abutment of the second link with the stopper, the second link rotates about the pivot shaft of the first link. The operation amount of the second link varies relative to the amount of operation of the throttle lever. Thus, the length of the cable pulled can be changed.

Therefore, in low and medium speed ranges of the engine, the throttle lever is operated at a light load proportional to the amount of operation of the throttle lever, and the abutment of the second link with the stopper gives rise to a restrictive feeling. Thereafter, the operator can feel an approach to the full open range of the engine. Thus, an operating lever device can be obtained which is desirable in the operation of light vehicles.

The mechanism for changing the length of the throttle cable pulled relative to the amount of operation of the operating lever can be realized by a simple mechanism in which two links are connected together through a shaft and one link is provided with a restriction portion, while a stopper member is provided for abutment with the other link.

Particularly in the present invention, only the links, shafts and stopper member are required in addition to the essential components such as the operating lever and the member for pulling and returning of the cable. Thus, a minimum number of components are required, and a simple structure can be realized.

Moreover, since all that is required is connecting two links together through a shaft and adding the stopper member, the mechanism can be received within a cover of the type which receives a conventional proportional type operating lever mechanism therein. Further, a small external form is produced.

Additionally, since the components concerned can be easily accommodated within a cover as mentioned previously, there is no difference in the external form from the conventional operating lever device of a proportional type. The mechanism is protected from the exterior elements, which is very advantageous to prevent snow damage.

The position of abutment of the stopper member with the second link is adjustable, so by adjusting the abutment position of the stopper member, it is possible to adjust the rotatable range of the throttle lever and obtain characteristics matching the engine characteristics, the driver's taste, and ease of use. Since the adjustment can be done by merely adjusting the abutment position of the stopper member with the second link, it is possible to use a screw mechanism so that adjustment is easy and the structure is simple.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A snowmobile comprising:

a body;

a steering ski supported on a front portion of the body;

a handlebar for turning said steering ski;

a track device suspended from a rear portion of the body;

an engine supported on the body, said engine having a fuel supply device with a throttle valve therein; and a throttle lever device for moving said throttle valve, the throttle lever device comprising:

- a housing connected to said handlebar;
- a throttle lever;
- a first pivot shaft for pivotally connecting the throttle lever to said housing for pivotal movement about a first axis;
- a first link attached to said first pivot shaft for pivoting about said first axis with pivotal motion of the throttle lever; and
- a second link pivotally connected to said first link by a second pivot shaft defining a second axis spaced from said first axis, said second link being pivotal with respect to said first link about said second axis.

2. The snowmobile according to claim 1, further comprising a stopper member disposed in a path of rotation of the second link for abutting with the second link.

3. The snowmobile according to claim 2, wherein upon abutment of the second link with the stopper member, the second link rotates about the second pivot shaft.

4. The snowmobile according to claim 2, wherein upon abutment of the second link with the stopper member, continued actuation of the throttle lever causes the first link to pivot about the first axis while the second link pivots about the second axis.

5. The snowmobile according to claim 4, wherein upon abutment of the second link with the stopper member, an amount of rotation of the second link changes and increases relative to an amount of rotation of the throttle lever.

6. The snowmobile according to claim 2, said stopper member including threads threadably engaged with said housing, said stopper member being rotatable for adjusting the position of abutment of the stopper member with the second link.

7. The snowmobile according to claim 1, further comprising:

an actuating cable; and a cable attachment portion on the second link for engagement with the actuating cable.

8. The snowmobile according to claim 1, further comprising a restricting portion on said first link for restricting rotation of the second link with respect to the first link.

9. The snowmobile according to claim 1, wherein said first axis is parallel to said second axis.

10. The snowmobile according to claim 1, said first pivot shaft including a first end and a second end, said throttle lever being connected to said first end of said first pivot shaft, and said first link being connected to said second end of said first pivot shaft.

11. The snowmobile according to claim 1, further comprising:

an actuating cable;

a cable attachment portion on the second link for engagement with the cable;

a restricting portion on said first link for restricting rotation of the second link with respect to the first link; and a stopper member disposed in a path of rotation of the second link for abutting with an abutment portion of the second link.

12. The snowmobile according to claim 11, said first pivot shaft including a first end and a second end, said throttle lever being connected to said first end of said first pivot shaft, and said first link being connected to said second end of said first pivot shaft, and wherein said first axis is parallel to said second axis.

13. The snowmobile according to claim 12, said second link including a first end, a second end, and a midportion therebetween, said cable attachment portion being located proximate said first end, said abutment portion being located proximate said second end, and said second pivot shaft being located proximate said midportion.

14. The snowmobile according to claim 13, wherein upon abutment of the second link with the stopper member, continued actuation of the throttle lever causes the first link to pivot about the first axis while the second link pivots about the second axis.

15. The snowmobile according to claim 14, wherein upon abutment of the second link with the stopper member, an amount of rotation of the second link changes and increases relative to an amount of rotation of the throttle lever.

16. The snowmobile according to claim 15, said stopper member including threads threadably engaged with said housing, said stopper member being rotatable for adjusting the position of abutment of the stopper member with the second link.

17. The snowmobile according to claim 11, said second link including a first end, a second end, and a midportion therebetween, said cable attachment portion being located proximate said first end, said abutment portion being located proximate said second end, and said second pivot shaft being located proximate said midportion.

* * * * *